United States Patent
Li

(10) Patent No.: US 9,936,266 B2
(45) Date of Patent: Apr. 3, 2018

(54) VIDEO ENCODING METHOD AND APPARATUS

(71) Applicant: TENCENT TECHNOLOGY (SHENZHEN) COMPANY LIMITED, Shenzhen (CN)

(72) Inventor: Dalong Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 380 days.

(21) Appl. No.: 14/274,056

(22) Filed: May 9, 2014

(65) Prior Publication Data

US 2014/0341269 A1    Nov. 20, 2014

Related U.S. Application Data

(63) Continuation of application No. PCT/CN2014/070802, filed on Jan. 17, 2014.

(30) Foreign Application Priority Data

May 17, 2013   (CN) .......................... 2013 1 0183173

(51) Int. Cl.
*H04N 19/12*    (2014.01)
*H04N 19/187*   (2014.01)
(Continued)

(52) U.S. Cl.
CPC ..... *H04N 21/8451* (2013.01); *H04N 21/2343* (2013.01); *H04N 21/85406* (2013.01)

(58) Field of Classification Search
None
See application file for complete search history.

(56) References Cited

U.S. PATENT DOCUMENTS 8,050,289 B1 * 11/2011 Masterson ......... H04N 21/2343
                                                        370/465
2004/0111677 A1 * 6/2004 Luken ............... G06F 17/30056
                                                        715/234
(Continued)

FOREIGN PATENT DOCUMENTS

CN    102098304    6/2011
CN    102404624    4/2012
(Continued)

OTHER PUBLICATIONS

Tencent Technology (Shenzhen) Company Limited; PCT/CN2014/070802 filed on Jan. 17, 2014; International Search Report on Patentability; dated May 6, 2014; The State Intellectual Property Office of the P.R. China (ISA/CN); 12 pages.

(Continued)

*Primary Examiner* — Kate Luo
(74) *Attorney, Agent, or Firm* — Dentons US LLP; Peter Su

(57) ABSTRACT

A video encoding method and apparatus are provided, in which the method comprises the steps of obtaining respective original picture data in sequence; generating respective multi-media audio and video files in sequence according to the obtained original picture data; parsing each multi-media audio and video file, encapsulating the result of parsing according to a predetermined standard to obtain encoded picture data corresponding to each multi-media audio and video file and conforming to the predetermined standard, and outputting the encoded picture data. The solutions in the present disclosure may meet the need of stream-typed video traffic for small granularity encoded picture data in frame level.

13 Claims, 4 Drawing Sheets

(51) Int. Cl.
*H04N 19/157* (2014.01)
*H04N 21/845* (2011.01)
*H04N 21/2343* (2011.01)
*H04N 21/854* (2011.01)

(56) References Cited

U.S. PATENT DOCUMENTS

| | | | |
|---|---|---|---|
| 2009/0083279 A1* | 3/2009 | Hasek | H04L 67/2823 |
| 2009/0161755 A1* | 6/2009 | Gordon | H04N 7/1675 |
| | | | 375/240.02 |
| 2011/0093900 A1* | 4/2011 | Patel | H04N 7/17318 |
| | | | 725/54 |
| 2012/0002717 A1 | 1/2012 | Ma et al. | |
| 2012/0140816 A1* | 6/2012 | Franche | H04N 19/172 |
| | | | 375/240.03 |
| 2012/0206650 A1* | 8/2012 | Lin | H04N 5/60 |
| | | | 348/515 |
| 2012/0210381 A1* | 8/2012 | Ozawa | H04N 21/47202 |
| | | | 725/114 |
| 2013/0042287 A1* | 2/2013 | Hong | H04H 60/82 |
| | | | 725/109 |
| 2013/0060956 A1* | 3/2013 | Nagaraj | H04N 21/4384 |
| | | | 709/231 |

FOREIGN PATENT DOCUMENTS

| | | |
|---|---|---|
| CN | 102611690 | 7/2012 |
| CN | 103002353 | 3/2013 |

OTHER PUBLICATIONS

English Abstract of Chinese Patent Application No. 102098304 A; 1 page.
English Abstract of Chinese Patent Application No. 103002353 A; 1 page.
English Abstract of Chinese Patent Application No. 102611690 A; 1 page.
Chinese Patent Application No. 201310183173.7, Chinese Patent Office, First Office Action dated Sep. 17, 2015; 6 pages.
English Concise Explanation of Relevance for Chinese Patent Application No. 201310183173.7, Chinese Patent Office, First Office Action dated Sep. 17, 2015; 1 page.
English Abstract of Chinese Patent Application 102404624 (A), Published on Apr. 4, 2012; 2 pages.

* cited by examiner

VIDEO ENCODING METHOD AND APPARATUS

CROSS REFERENCE TO RELATED APPLICATIONS

This application is a continuation application of the PCT Patent Application No. PCT/CN2014/070802, entitled "VIDEO ENCODING METHOD AND APPARATUS," filed on Jan. 17, 2014, which claims priority benefit of Chinese Patent Application No. 201310183173.7, entitled "VIDEO ENCODING METHOD AND APPARATUS," filed on May 17, 2013, the disclosures of which are herein incorporated by reference in their entireties.

TECHNICAL FIELD

The present disclosure relates to video encoding technology, and in particular to a video encoding method and a video encoding apparatus.

BACKGROUND

Currently, various video encoding standards such as the H.264 standard have been widely accepted in the industry. With the rapid development of wireless connectivity, the video encoding standards have become a standard configuration in the underlying framework of the mobile platform in many smart terminals.

However, some mobile platforms only provide specific forms of encapsulating, for example, a high granularity public Application Programming Interface (API) encapsulating in a level of Moving Pictures Experts Group 4 (MP4) file. The specific implementation includes obtaining original picture data by operating a camera or the like, and performing the compression encoding, protocol encapsulating etc. of the original picture data to generate a video file with a container format of MP4 and a video encoding format of H.264.

Obviously, the above method is well adapted to offline video traffic. However, since huge stream-typed video traffic needs small granularity encoded picture data in frame level, the above method is not applicable as it cannot meet the real-time needs etc. of stream-typed video traffic. For example, in the scenario of video chatting, it is necessary to send out every frame of original picture data immediately after the frame has been processed rather than send out the data after a segment of video has been processed.

SUMMARY OF THE DISCLOSURE

In view of the above, the present disclosure provides a video encoding method and a video encoding apparatus, which can meet the need of stream-typed video traffic for small granularity encoded picture data in frame level.

One aspect of the present disclosure provides a video encoding method, including steps of obtaining, by a picture obtaining unit using a processor, respective original picture data in sequence, generating, by a file generating unit using a processor, respective multi-media audio and video files in sequence according to the obtained original picture data; parsing, by a file parsing unit using a processor, each multi-media audio and video file respectively, encapsulating the result of parsing according to a predetermined standard to obtain encoded picture data corresponding to respective multi-media audio and video files and conforming to the predetermined standard, and outputting the encoded picture data.

In the above video encoding method, the step of parsing each multi-media audio and video files respectively, encapsulating the result of parsing according to a predetermined standard to obtain encoded picture data corresponding to respective multi-media audio and video files and conforming to the predetermined standard includes parsing each multi-media audio and video file respectively, and obtaining mdat box data therein, the mdat box data including one or more pieces of encoded picture data; modifying the values of the first four bytes of the data segment of respective encoded picture data in the mdat box data according to the requirement of the predetermined standard; and taking respective modified data segments as respective encoded picture data conforming to the predetermined standard.

The above video encoding method further includes for each generated multi-media audio and video file, before outputting the first encoded picture data conforming to the predetermined standard corresponding to the multi-media audio and video file, generating sequence parameter set network abstraction layer data and picture parameter set network abstraction layer data corresponding to the multi-media audio and video file respectively, and outputting the generated sequence parameter set network abstraction layer data and picture parameter set network abstraction layer data together with the first encoded picture data conforming to the predetermined standard.

In the above video encoding method, the step of generating the sequence parameter set network abstraction layer data and the picture parameter set network abstraction layer data corresponding to the multi-media audio and video file respectively includes generating the sequence parameter set network abstraction layer data and the picture parameter set network abstraction layer data corresponding to the multi-media audio and video file according to the network abstraction layer data structure defined in the predetermined standard.

The above video encoding method further includes initiating N threads when the first frame of original picture data is obtained, where N is a positive integer which is larger than 1; determining whether there is a free thread each time the condition for generating a new multi-media audio and video file is met, and, if so, selecting a free thread to generate the multi-media audio and video file or otherwise waiting for a free thread to generate the multi-media audio and video file.

The above video encoding method further includes initiating P threads when the first multi-media audio and video file is generated, where P is a positive integer which is larger than 1; determining whether there is a free thread each time a new multi-media audio and video file needs to be parsed and encapsulated, and, if so, selecting a free thread to parse and encapsulate the multi-media audio and video file or otherwise waiting for a free thread to parse and encapsulate the multi-media audio and video file.

The above video encoding method further includes starting to parse and encapsulate generated multi-media audio and video files when it is determined that the number of generated multi-media audio and video files reaches Q, where Q is a positive integer which is larger than 1.

The above video encoding method further includes each time one piece of encoded picture data conforming to the predetermined standard is received, decoding it and performing picture displaying according to the result of decoding.

Another aspect of the present disclosure provides a video encoding apparatus, including a picture obtaining unit using a processor and configured to obtain respective original picture data in sequence; a file generating unit using a processor and configured to generate respective multi-media audio and video files in sequence according to the obtained original picture data; a file parsing unit using a processor and configured to parse each multi-media audio and video file respectively, to encapsulate the result of parsing according to a predetermined standard to obtain encoded picture data corresponding to each multi-media audio and video file and conforming to the predetermined standard, and to output the encoded picture data respectively.

In the above video encoding apparatus, the file parsing unit is configured to parse each multi-media audio and video file respectively to obtain mdat box data including one or more pieces of encoded picture data, to modify the values of the first four bytes of the data segments of each encoded picture data in the mdat box data according to the requirement of the predetermined standard, and to take each modified data segment as each encoded picture data conforming to the predetermined standard.

In the above video encoding apparatus, the file parsing unit is configured to for each generated multi-media audio and video file, before outputting the first encoded picture data conforming to the predetermined standard corresponding to the multi-media audio and video file, generate sequence parameter set network abstraction layer data and picture parameter set network abstraction layer data corresponding to the multi-media audio and video file respectively, and output the generated sequence parameter set network abstraction layer data and picture parameter set network abstraction layer data together with the first encoded picture data conforming to the predetermined standard.

In the above video encoding apparatus, the file parsing unit is configured to generate the sequence parameter set network abstraction layer data and the picture parameter set network abstraction layer data corresponding to the multi-media audio and video files according to the network abstraction layer data structure defined in the predetermined standard.

In the above video encoding apparatus, the file generating unit is configured to initiate N threads when the first frame of original picture data is obtained, where N is a positive integer which is larger than 1; determine whether there is a free thread each time the condition for generating a new multi-media audio and video file is met, and, if so, select a free thread to generate the multi-media audio and video file or otherwise wait for a free thread to generate the multi-media audio and video file.

In the above video encoding apparatus, the file parsing unit is configured to initiate P threads when the first multi-media audio and video file is generated, where P is a positive integer which is larger than 1; determine whether there is a free thread each time a new multi-media audio and video file needs to be parsed and encapsulated, and, if so, select a free thread to parse and encapsulate the multi-media audio and video file or otherwise wait for a free thread to parse and encapsulate the multi-media audio and video file.

In the above video encoding apparatus, the file parsing unit is configured to start to parse and encapsulate generated multi-media audio and video files when it is determined that the number of generated multi-media audio and video files reaches Q, where Q is a positive integer which is larger than 1.

The above video encoding apparatus further includes a data receiving unit using a processor and configured to receive respective encoded picture data conforming to the predetermined standard sent by another apparatus other than the video encoding apparatus in which the data receiving unit is located; a data decoding unit using a processor and configured to, each time one piece of encoded picture data conforming to the predetermined standard is received, decode the one piece of encoded picture data; and an image displaying unit using a processor and configured to perform picture displaying according to the result of decoding.

The present disclosure also provides a terminal device including the video encoding apparatus provided in the above aspect of the present disclosure.

The present disclosure also provides a non-transitory computer readable storage medium having stored thereon program instructions which, when executed on a computing device, instruct the computing device to perform respective steps of the video encoding method in the above aspect of the present disclosure.

Accordingly, by adopting the solution provided in the present disclosure, it is possible to obtain respective original picture data in sequence, and generate respective multi-media audio and video files such as MP4 files in sequence according to the obtained respective original picture data by means of the existing video encoding function of the mobile platform. Based on this, for each multi-media audio and video file, it is possible to obtain encoded picture data such as H.264 encoded picture data corresponding to respective multi-media audio and video files and conforming to the predetermined standard by parsing respective multi-media audio and video files respectively and encapsulating the result of parsing according to the predetermined standard, and output the encoded picture data. Thus, the need of stream-typed video traffic for small granularity encoded picture data in frame level is met, and the system compatibility is improved. In addition, the solutions provided in the present disclosure are easily and conveniently implemented, which is good for popularization and promotion.

BRIEF DESCRIPTION OF THE DRAWINGS

In order to illustrate the embodiments of the present disclosure clearly, there follows, a simple introduction of the accompanying drawings used in the description of the embodiments of the present disclosure. Obviously, the drawings in the following description are just some embodiments of the present disclosure. For those skilled in the art, other accompanying drawings may be obtained without creative efforts according to these accompanying drawings, in which.

DETAILED DESCRIPTION OF EMBODIMENTS

The solutions for video encoding provided by the present disclosure may make use of the existing video encoding function of the mobile platform to meet the requirement of the stream-typed video traffic for small granularity encoded picture data in frame level.

Figure 1:
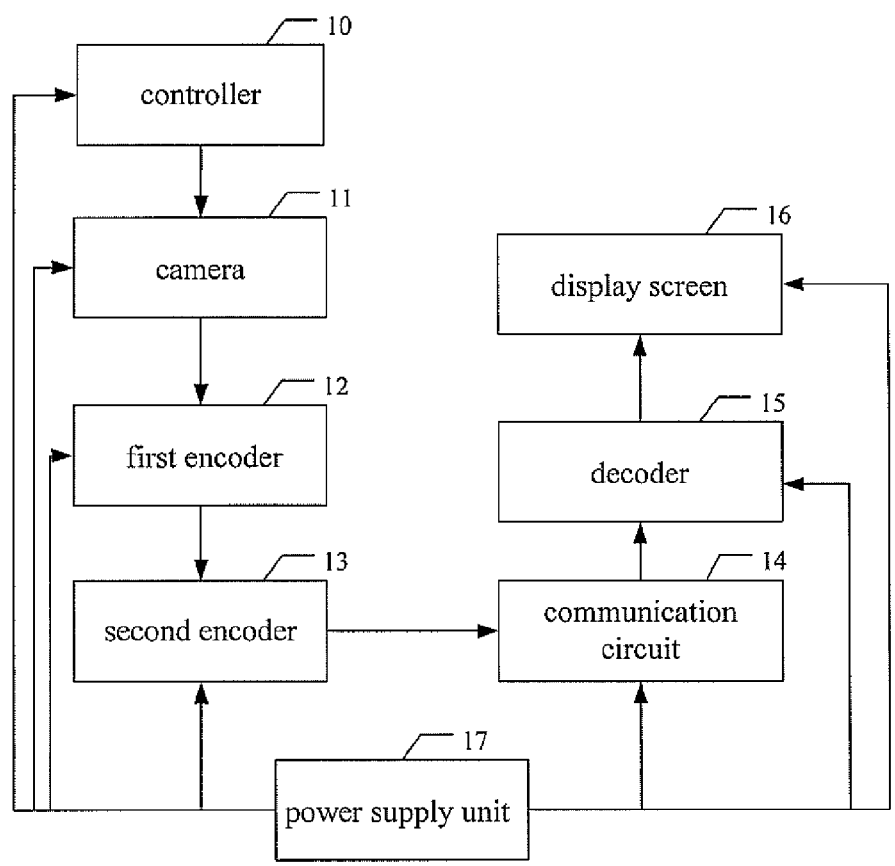
FIG. 1 is a schematic diagram of the running environment of a video encoding apparatus of the present disclosure.

FIG. 1 is a schematic diagram of the running environment of a video encoding apparatus of the present disclosure. The apparatus may be disposed in a smart terminal. As shown in FIG. 1, the smart terminal may include a controller 10, a camera 11, a first encoder 12, a second encoder 13, a communication circuit 14, a decoder 15, a display screen 16, a power supply unit 17, and so on.

The controller 10 is configured to control the operation of the camera 11, for example, control when to start collecting original picture data and how often to collect original picture data. The camera 11 collects the original picture data under the control of the controller 10, and sends respective collected original picture data to the first encoder 12. The first encoder 12 generates respective multi-media audio and video files according to respective original picture data collected by the camera 11, and sends respective generated multi-media audio and video files to the second encoder 13. The second encoder 13 parses each received multi-media audio and video file respectively and encapsulates the result of parsing according to a predetermined standard to obtain encoded picture data respectively responding to each multi-media audio and video file and conforming to the predetermined standard, and sends the encoded picture data to the receiving side by the communication circuit 14. The communication circuit 14 sends each encoded picture data conforming to the predetermined standard outputted by the second encoder 13 to the receiving side (for example, the decoder 15) respectively, and receives respective encoded picture data conforming to the predetermined standard sent by another apparatus and sends it to the decoder 15. The decoder 15 decodes respective received encoded picture data conforming to the predetermined standard, and performs picture displaying on the display screen 16 according to the result of decoding. The display screen 16 may be a liquid-crystal display screen or the like. The power supply unit 17 supplies power to other parts respectively, and may employ a power supply such as a battery, or an outer power source, or the like.

In practical applications, the above multi-media audio and video file may be an MP4 file, an MP5 file, or the like. The above predetermined standard is not limited to H.264 standard or H.265 standard. The solutions provided in the present disclosure are described in detail in the following by taking an MP4 file and the H.264 standard as an example.

Figure 2:
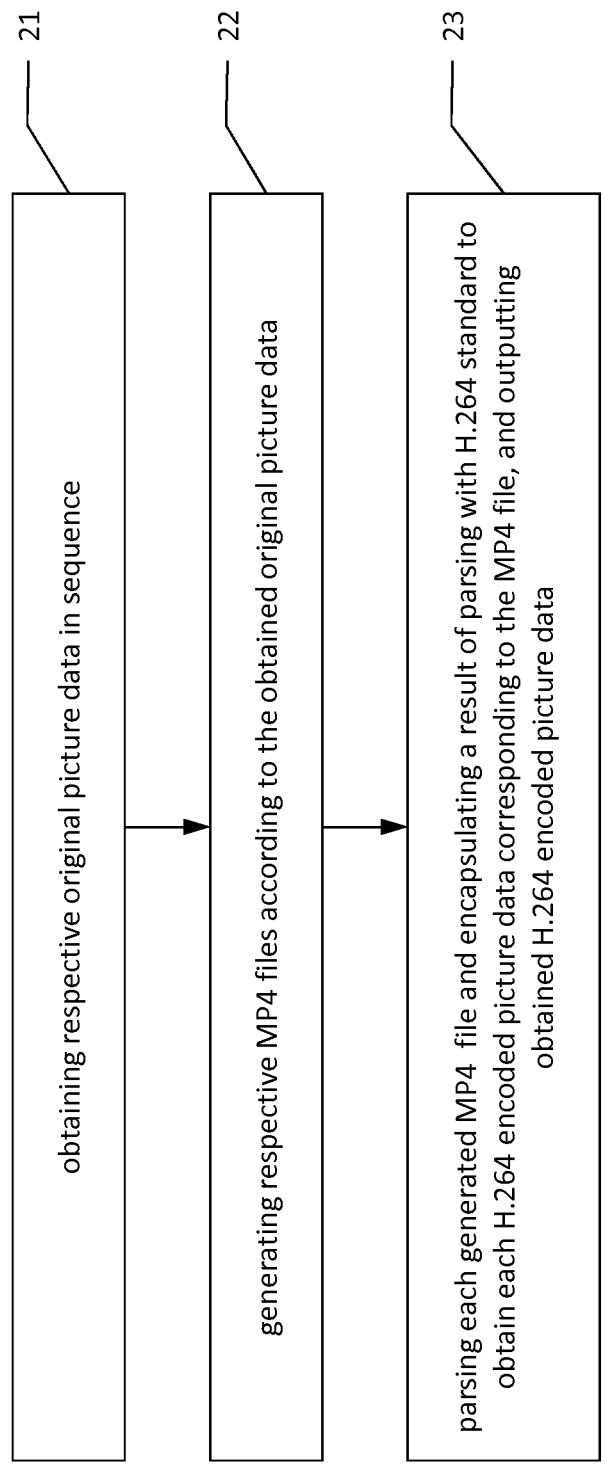
FIG. 2 is flowchart of an embodiment of a video encoding method of the present disclosure.

FIG. 2 is a flowchart of an embodiment of the video encoding method of the present disclosure. As shown in FIG. 2, the method includes the following steps.

At step 21, obtaining respective original picture data in sequence.

In practical applications, for example, in the scenario of video chatting, a camera may be used to collect respective original picture data. The outputted data of the camera is byte stream data conforming to a certain digital picture color space format, which is usually not compressed.

At step 22, generating respective MP4 files in sequence according to obtained original picture data.

At this step, each original picture data may be encoded (compressed) according to the H.264 standard and, based on each encoded picture data, respective binary files (i.e. MP4 file) may be generated according to the MP4 file format standard.

It is known by those skilled in the art that an MP4 file usually corresponds to the duration (clip) of video. The duration may be determined depending on the practical application, for example 1 second. An MP4 file may be generated according to respective original picture data obtained during this 1 second.

For example, in the scenario of video chatting, the camera collects original picture data once every 1/10 second (i.e. obtains one frame of original picture). Thus, original picture data is collected ten times within 1 second. Accordingly, one MP4 file may be generated according to the original picture data collected ten times.

Based on the above description, the solutions of the present disclosure provide improved measures. For example, N threads are initiated when the first frame of original picture data is obtained, where N is a positive integer which is larger than 1 and the value of N may be determined according to practical needs. In this manner, it is determined whether there is a free thread each time the condition for generating a new MP4 file is met. If there is, a free thread is selected to perform the generation of the MP4 file; otherwise, the emergence of a free thread is waited for to perform the generation of the MP4 file.

For example, two threads, which are thread 1 and thread 2, are initiated. In the scenario of video chatting, one MP4 file is generated every 1 second. Therefore, when the first 1 second is past, thread 1 may be used to generate the first MP4 file; when the second 1 second is past, thread 2 may be used to generate the second MP4 file assuming that thread 1 has not finished its work; when the third 1 second is past, thread 1 may be used to generate the third MP4 file assuming that thread 2 has not finished its work but thread 1 has finished its work; and so on. In this manner, it is possible to avoid the waiting time and thus accelerate the generation of MP4 files.

Further, in practical applications, it is usually necessary to call some objects to generate an MP4 file. Because the building of these objects may take a long time, the required objects may be built in advance in order to reduce time delay. In this way, the objects may be called directly when they are needed.

At step 23, performing parsing for each generated MP4 file and performing encapsulating with the H.264 standard for the result of parsing to obtain respective H.264 encoded picture data corresponding to the MP4 file, and outputting each obtained H.264 encoded picture data respectively.

For offline video traffic, since it does not need small granularity encoded picture data in frame level, each generated MP4 file may be output directly.

However, for stream-typed video traffic, because it needs small granularity encoded picture data in frame level, it is necessary to parse each generated MP4 file and encapsulate the result of parsing with the H.264 standard to obtain each H.264 encoded picture data corresponding to the MP4 file, and outputting each obtained H.264 encoded picture data respectively.

In view of respective MP4 files collectively, the principle for outputting respective H.264 encoded picture data is as follows. For one piece of H.264 encoded picture data, the earlier the original picture data corresponding to the piece is obtained, the earlier the piece is outputted. That is, the order of pictures viewed by the user of the final receiving side needs to be the same as the order of obtaining each picture at the sending side.

Similar to step 22, in step 23 it is also possible to initiate multiple threads simultaneously to perform parsing and encapsulating of the MP4 files. This may be implemented specifically as follows. P threads are initiated when the first MP4 file is to be generated, where P is a positive integer which is larger than 1 and the value of P may be determined according to practical needs. It is determined whether there is a free thread each time a new MP4 file needs to be parsed and encapsulated. If there is, a free thread is selected to parse and encapsulate the MP4 file; otherwise, a free thread is waited for to parse and encapsulate the MP4 file.

For example, two threads, which are thread 3 and thread 4, are initiated. When the first MP4 file has been generated, thread 3 may be used to parse and encapsulate the first MP4 file; when the second MP4 file has been generated, thread 4 may be used to parse and encapsulate the second MP4 file assuming that thread 3 has not finished its work; when the third MP4 file has been generated, thread 3 may be used to parse and encapsulate the third MP4 file assuming that thread 4 has not finished its work but thread 3 has finished its work; and so on. In this manner, it is possible to avoid the waiting time and thus accelerate the parsing and encapsulating of MP4 files.

Further, for an MP4 file, the time taken to parse and encapsulate is shorter than the time taken to generate the MP4 file. For this reason, the following problem may occur. When an MP4 file has been generated, it is parsed and encapsulated and each obtained H.264 encoded picture data is outputted respectively. However, at this point, the next MP4 file has not been generated, which results in the interruption of the output.

In order to avoid the above problem, the solutions in the present disclosure propose starting to parse and encapsulate generated MP4 files only when the number of the generated MP4 files reaches Q, where Q is a positive integer which is larger than 1 and its value (e.g. 3) is determined according to practical needs. In other words, parsing and encapsulating the generated MP4 files only starts when the number of the buffered MP4 files reaches a predetermined requirement.

For example, when the first MP4 file has been generated, it is buffered rather than parsed and encapsulated. Similarly, when the second MP4 file has been generated, it is also buffered rather than parsed and encapsulated. When the third MP4 has been generated, it is buffered, and the parsing and encapsulating for the first MP4 starts, and so on. In this way, it is possible to parse and encapsulate the MP4 files buffered previously while waiting for a new MP4 file to be generated to avoid the interruption of the output.

In the following, how to parse and encapsulate MP4 files is further described in detail.

Figure 3:
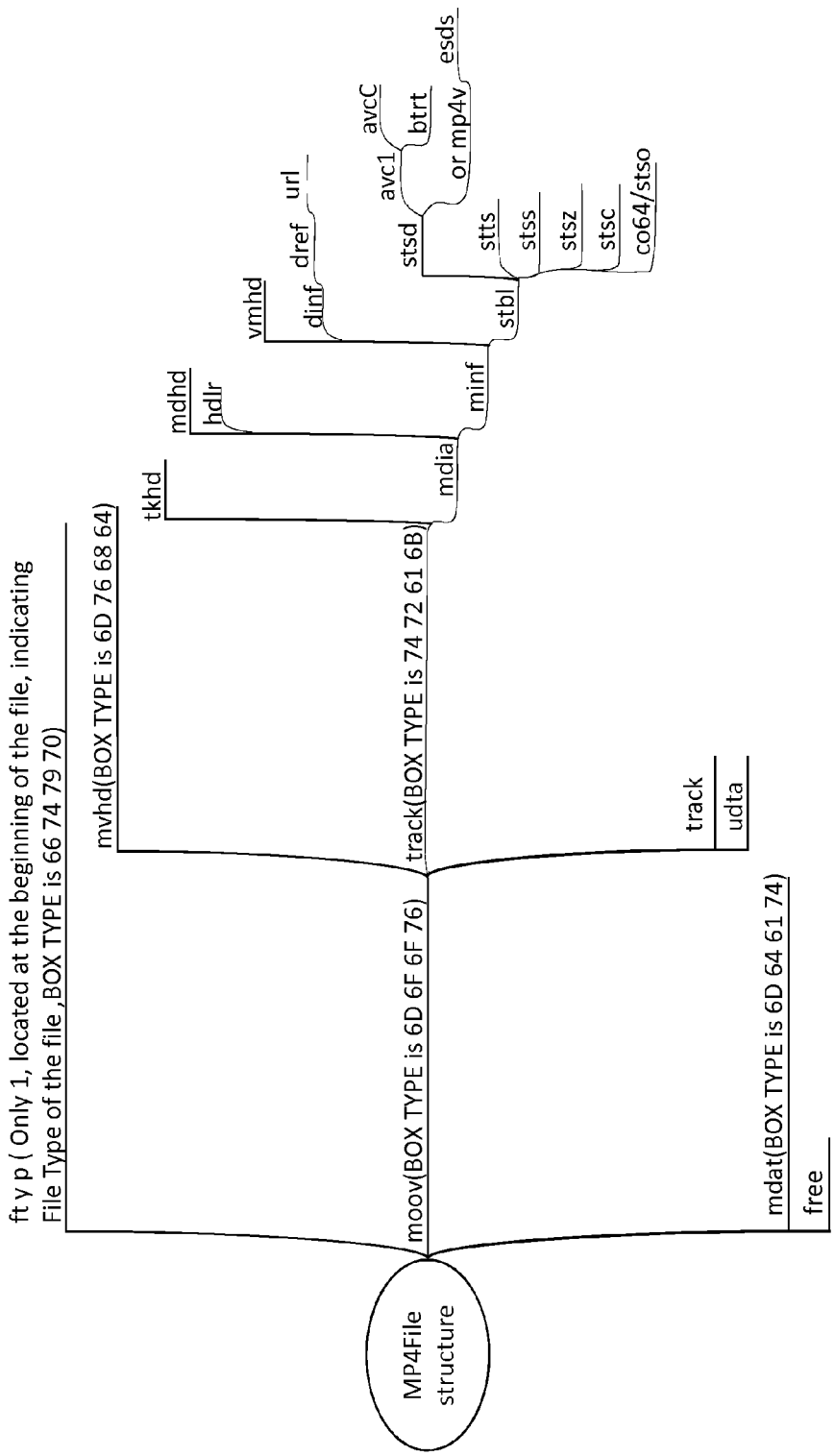
FIG. 3 is a structure schematic diagram of the existing MP4 file.

FIG. 3 is a structure schematic diagram of an existing MP4 file.

Accordingly, each generated MP4 file may be parsed respectively, and the "mdat box" data within it may be obtained. Then, the values of the first four bytes in the data segments corresponding to various H.264 encoded picture data in the obtained "mdat box" data may be modified as 0x00 0x00 0x00 0x01, and respective modified data segments are taken as respective H.264 encoded picture data.

For example, if one MP4 file is generated based on 10 pieces of original picture data, then the mdat box data in the MP4 file may be obtained by parsing the MP4 file, and the mdat box data includes data segments respectively corresponding to the 10 pieces of original picture data (each piece of original picture data corresponds to one H.264 encoded picture data). The values of the first four bytes in the 10 data segments are modified as 0x00 0x00 0x00 0x01 respectively. The obtained 10 modified data segments are the required 10 pieces of H.264 encoded picture data.

In addition, when the receiving side subsequently receives respective H.264 encoded picture data and performs decoding, it needs to use Sequence Parameter Set Network Abstraction Layer (SPS NAL) data and Picture Parameter Set Network Abstraction Layer (PPS NAL) data corresponding to each MP4 file. Therefore, for each generated MP4 file, before outputting the first H.264 encoded picture data corresponding to the MP4 file, it is necessary to generate the SPS NAL data and the PPS NAL data corresponding to the MP4 file respectively, and output the generated SPS NAL data and the PPS NAL data together with the first H.264 encoded picture data. That is, it is necessary to output SPS NAL data and PPS NAL data while outputting the first H.264 encoded picture data. After that, only each (other than the first) H.264 encoded picture data is outputted respectively.

In particular, for each generated MP4 file, the SPS NAL data and the PPS NAL data corresponding to the MP4 file may be generated according to the NAL data structure defined in the H.264 standard respectively. The NAL data structure is 0x00 0x00 0x00 0x01+Network Abstraction Layer Unit Header (NALU Header) field+Network Abstraction Layer Unit Payload (NALU Payload) field.

For SPS NAL data, NALU Header field is used to indicate that the type of NAL data is SPS, and NALU Payload field is used to carry the payload content of the SPS NAL data, which may be obtained from the "stsd box" data obtained through parsing the MP4 file.

For PPS NAL data, NALU Header field is used to indicate that the type of NAL data is PPS, and NALU Payload field is used to carry the payload content of the PPS NAL data, which may be obtained from the "stsd box" data obtained through parsing the MP4 file.

The length of NALU Header field is 1 byte, and its structure is as shown in Table 1.

TABLE 1

Structure of NALU Header Field

| F | 1 bit | forbidden_zero_bit, H.264 defines that the bit must be 0 |
| NRI | 2 bit | nal_ref_idc, 0~3, identifying the importance of the NAL (3 represents the highest importance) |
| Type | 5 bit | nal_unit_type, identifying the type of the NAL |
| | 0 | Not used |
| | 1 | Not using Data Partitioning, Not Instantaneous Decoding Refresh (IDR) Slice of picture |
| | 2 | Using Data Partitioning and being Slice A |
| | 3 | Using Data Partitioning and being Slice B |
| | 4 | Using Data Partitioning and being Slice C |
| | 5 | Slice of IDR picture |
| | 6 | Supplemental Enhancement Information unit (SEI) |
| | 7 | Sequence Parameter Set (SPS) |
| | 8 | Picture Parameter Set (PPS) |
| | 9 | Delimiter |
| | 10 | End of sequence |
| | 11 | End of code stream |
| | 12 | Padding |
| | 13 . . . 23 | Reserved |
| | 24 . . . 31 | Not used |

For SPS NAL data, the value of "F" bit in the NALU Header field is 0 (1 bit in total), the value of "NRI" bits is 11 (2 bits in total), and the value of "Type" bits is 00111 (5 bits in total). For PPS NAL data, the value of "F" bit in the NALU Header field is 0, the value of "NRI" bits is 11, and the value of "Type" bits is 01000.

Each H.264 encoded picture data also needs to conform to the structure of "0x00 0x00 0x00 0x01+NALU Header field+NALU Payload field". Each data segment obtained by modifying the values of the first four bytes in the above data segments conforms to the above structure.

In practical applications, each outputted H.264 encoded picture data may be sent to the receiving side by a channel which may be a data transmission channel such as wired or wireless internet, 3G or 2G telecommunication network, or the like. The form of the channel is not limited in the present disclosure. In addition, from the point of view of a digital communication system, before transmitting the data, some forms of channel encoding may be performed to improve the robustness of the data. For example, real-time transport protocol (RTP) encapsulating may be performed on data to make it adapt to transmission via the internet.

Accordingly, each time the receiving side receives one piece of H.264 encoded picture data, decoding may be performed on it and then the picture displaying is performed according to the result of such decoding.

Because the size of one piece of H.264 encoded picture data may be large, it may need to be divided into multiple data packages when transmitted. In this way, when the receiving side receives the data, it is necessary to combine the multiple data packages of the same H.264 encoded picture data.

Further, considering the unreliability of the channel transmission, the received data package may not be completely the same as the sent data package, and this results in an error. For this reason, the following process may be performed at the reception side. The data package with error is discarded directly, and the decoder synchronization is started from the data package, which has been decoded correctly. Alternatively, if fault tolerance encoding technology such as Forward Error Correction (FEC) is used when the data package is transmitted, the reverse process of the fault tolerance encoding technology may be used to recover the data package with error.

In addition, when the receiving side performs decoding, some fault tolerance encoding technologies in the field of video communication such as Data Partitioning, Reference Frame Selection or the like may be used to avoid the effect of the erroneous data on the decoding process.

Those skilled in the art could practice the decoding and picture displaying in any way, which does not limit the scope of the present disclosure.

The above is the description of the method embodiments of the present disclosure.

Figure 4:
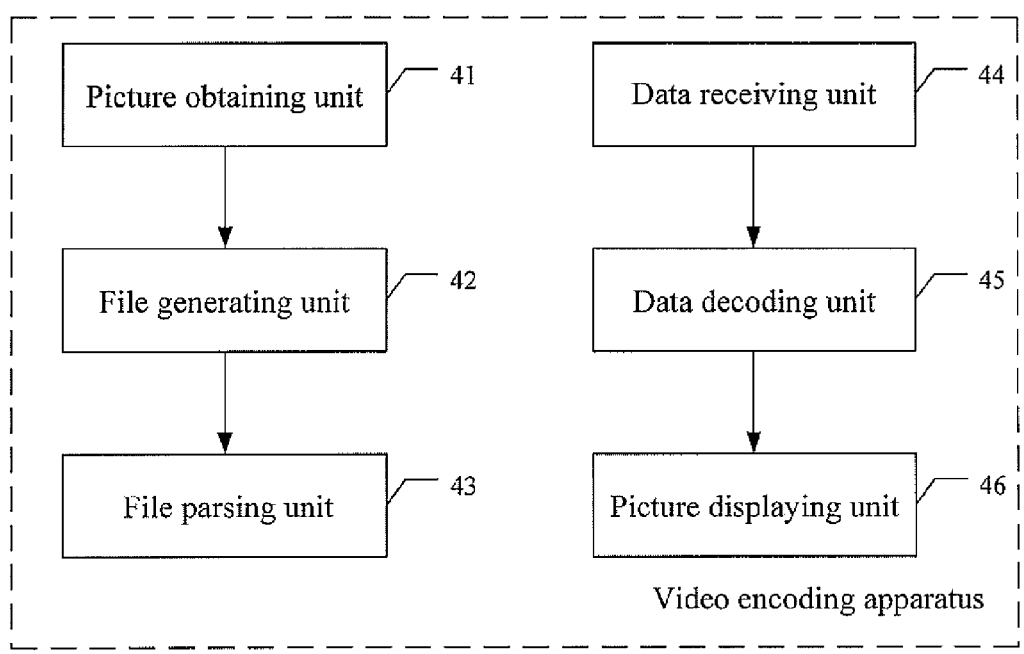
FIG. 4 is a composition structure schematic diagram of an embodiment of the video encoding apparatus of the present disclosure.

Based on the above description, FIG. 4 is a schematic diagram of the composition structure of an embodiment of the video encoding apparatus of the present disclosure. As shown in FIG. 4, the apparatus includes a picture obtaining unit 41, a file generating unit 42, and a file parsing unit 43.

The picture obtaining unit 41 is configured to obtain respective original picture data in sequence and send respective original picture data to the file generating unit respectively 42.

The file generating unit 42 is configured to generate respective multi-media audio and video files in sequence according to the obtained respective original picture data, and to send each multi-media audio and video file to the file parsing unit 43 respectively.

The file parsing unit 43 is configured to parse each multi-media audio and video file respectively, to encapsulate the result of parsing according to a predetermined standard to obtain encoded picture data corresponding to each multi-media audio and video file and conforming to the predetermined standard, and to output the encoded picture data respectively.

In particular, the file parsing unit 43 may parse each multi-media audio and video file respectively, and obtain mdat box data therein, the mdat box data including one or more pieces of encoded picture data; modify the values of the first four bytes of the data segments of each encoded picture data in the mdat box data according to the requirement of the predetermined standard; and take each modified data segment as each encoded picture data conforming to the predetermined standard.

The file parsing unit 43 may be further configured to for each generated multi-media audio and video file, before outputting the first encoded picture data conforming to the predetermined standard corresponding to the multi-media audio and video file, generate SPS NAL data and PPS NAL data corresponding to the multi-media audio and video file respectively, and output the generated SPS NAL data and PPS NAL data together with the first encoded picture data conforming to the predetermined standard.

In particular, the file parsing unit 43 may generate the SPS NAL data and PPS NAL data corresponding to the multi-media audio and video file according to the NAL data structure defined in the predetermined standard.

The file generating unit 42 may be further configured to initiate N threads when the first frame of original picture data is obtained, where N is a positive integer which is larger than 1; determine whether there is a free thread each time the condition for generating a new multi-media audio and video file is met, and, if so, select a free thread to perform the generation of the multi-media audio and video file or otherwise wait for the emergence of a free thread to perform the generation of the multi-media audio and video file.

The file parsing unit 43 may be further configured to initiate P threads when the first multi-media audio and video file is generated, where P is a positive integer which is larger than 1; determine whether there is a free thread each time a new multi-media audio and video file needs to be parsed and encapsulated, and, if so, select a free thread to parse and encapsulate the multi-media audio and video file or otherwise wait for the emergence of a free thread to parse and encapsulate the multi-media audio and video file.

The file parsing unit 43 may be further configured to start to parse and encapsulate generated multi-media audio and video files when it is determined that the number of the generated multi-media audio and video files reaches Q, where Q is a positive integer which is larger than 1.

In addition, the apparatus shown in FIG. 4 may further include a data receiving unit 44, a data decoding unit 45 and a picture displaying unit 46.

The data receiving unit 44 is configured to receive the encoded picture data conforming to the predetermined standard sent by another apparatus other than the video encoding apparatus in which the data receiving unit is located, and send each encoded picture data conforming to the predetermined standard to the data decoding unit 45 respectively.

The data decoding unit 45 is configured to, each time one piece of encoded picture data conforming to the predetermined standard is received, decode the picture data.

The picture displaying unit 46 is configured to display the decoded picture data on a screen according to the result of decoding.

In the embodiment shown in FIG. 4, the multi-media audio and video file may be a MP4 file, and the predetermined standard may be the H.264 standard.

Respective units contained in the above respective embodiments may be divided according to functional logic, but it is not limited to the above division. Other different units may be used to implement the above respective embodiments of the present disclosure as long as they may carry out corresponding functions. In addition, the specific name of each functional unit is only to distinguish one from another, but not used to limit the protection scope of the present disclosure.

Further, it may be understood by those ordinary skilled in the art that all or part of the steps for implementing the above embodiments may be implemented by related hardware instructed by a program which may be stored in a computer readable storage medium which may be ROM/RAM, a magnetic disk, an optical disc or the like.

In general, the above describes is only specific embodiments of the present disclosure and is not intended to limit the protection scope of the present disclosure. Any modification, equivalent replacement, enhancement, or the like within the spirit and principle of the present disclosure should all be contained within the protection scope of the present disclosure.

What is claimed is:

1. A video encoding method, comprising:
    obtaining, by a picture obtaining unit using a processor, respective original picture data in sequence, each original picture data including a first number of original picture frames;
    generating, by a file generating unit using a processor, respective multi-media audio and video files in sequence according to the obtained original picture data, wherein each audio file or each video file is obtained by compressing the first number of original picture frames according to the first encoding mode;
    parsing, by a file parsing unit using a processor, each multi-media audio and video file according to the first encoding mode to obtain a first number of data segments, encapsulating the first number of data segments according to the second encoding mode to obtain the first number of encoded picture data corresponding to each multi-media audio and video file and conforming to the second encoding mode, wherein the first encoding mode and the second encoding mode are different,
    wherein the parsing and encapsulating generated multi-media audio and video file are performed by:
    when the $1^{st}$ to (Q−1)th multi-media audio and video files have been generated, buffering them rather than parsing and encapsulating them, where Q is a positive integer which is larger than 1, and
    when the Qth multi-media audio and video file has been generated, buffering it, and starting to parse and encapsulate the buffered Q multi-media audio and video files from the 1st multi-media audio and video file, and
    outputting the first number of encoded picture data for a video decoding apparatus to reproduce the first number of encoded picture data;
    wherein the step of parsing each multi-media audio and video file according to the first encoding mode to obtain a first number of data segments, encapsulating the first number of data segments according to the second encoding mode to obtain encoded picture data corresponding to each multi-media audio and video file and conforming to the second encoding mode comprising:
    parsing each multi-media audio and video file according to the first encoding mode to obtain mdat box data including a first number of data segments;
    modifying the values of the first four bytes of the data segments in the mdat box data according to the second encoding mode, and taking each modified data segment as each encoded picture data conforming to the second encoding mode.

2. The method of claim 1, further comprising:
    for each generated multi-media audio and video file, before outputting the first encoded picture data conforming to the second encoding mode corresponding to the multi-media audio and video file, generating sequence parameter set network abstraction layer data and picture parameter set network abstraction layer data corresponding to the multi-media audio and video file respectively, and outputting the generated sequence parameter set network abstraction layer data and picture parameter set network abstraction layer data together with the first encoded picture data conforming to the second encoding mode.

3. The method of claim 2, the step of generating sequence parameter set network abstraction layer data and picture parameter set network abstraction layer data corresponding to the multi-media audio and video file respectively comprising:
    generating the sequence parameter set network abstraction layer data and picture parameter set network abstraction layer data corresponding to the multi-media audio and video file according to the network abstraction layer data structure defined in the second encoding mode.

4. The method of claim 1, further comprising:
    initiating N threads when the first frame of original picture data is obtained, where N is a positive integer which is larger than 1;
    determining whether there is a free thread each time the condition for generating a new multi-media audio and video file is met, and selecting a free thread to generate the multi-media audio and video file if there is, otherwise waiting for a free thread to generate the multi-media audio and video file.

5. The method of claim 1, further comprising:
    initiating P threads when the first multi-media audio and video file is generated, where P is a positive integer which is larger than 1;
    determining whether there is a free thread each time a new multi-media audio and video file needs to be parsed and encapsulated, and selecting a free thread to parse and encapsulate the multi-media audio and video file if there is, otherwise waiting for a free thread to parse and encapsulate the multi-media audio and video file.

6. The method of claim 1, further comprising:
    each time one piece of encoded picture data conforming to the second encoding mode is received, decoding the one piece of encoded picture data and performing picture displaying according to the result of decoding.

7. A non-transitory computer-readable storage medium storing program instructions which, when executed on a computer, cause the computer to execute the respective steps of the video encoding method according to claim 1.

8. A video encoding apparatus, comprising a memory and a processor coupled to the memory, wherein the memory storing instructions when being executed by the processor, cause the processor to perform the following operations:
    obtaining respective original picture data in sequence, each original picture data including a first number of original picture frames;
    generating respective multi-media audio and video files in sequence according to the obtained each original picture data, wherein each audio file or each video file is obtained by compressing the first number of original picture frames according to the first encoding mode; and
    parsing each multi-media audio and video file according to the first encoding mode to obtain a first number of data segments, encapsulating the first number of data segments according to the second encoding mode to obtain encoded picture data corresponding to each multi-media audio and video file and conforming to the second encoding mode, wherein the first encoding mode and the second encoding mode are different, wherein the parsing and encapsulating generated multi-media audio and video file are performed by:

when the $1^{st}$ to (Q−1)th multi-media audio and video files have been generated, buffer them rather than parsing and encapsulating them, where Q is a positive integer that is larger than 1, and when the Qth multi-media audio and video file has been generated, buffer it, and start to parse and encapsulate the buffered Q multi-media audio and video files from the $1^{st}$ multi-media audio and video file, and outputting the first number of encoded picture data for a video decoding apparatus to reproduce the first number of encoded picture data;

wherein the step of parsing each multi-media audio and video file according to the first encoding mode to obtain a first number of data segments, encapsulating the first number of data segments according to the second encoding mode to obtain encoded picture data corresponding to each multi-media audio and video file and conforming to the predetermined standard comprising:

parsing each multi-media audio and video file according to the first encoding mode to obtain mdat box data including a first number of data segments;

modifying the values of the first four bytes of the data segments in the mdat box data according to the requirement of the second encoding mode, and taking each modified data segment as each encoded picture data conforming to the second encoding mode.

9. The apparatus of claim 8, wherein the instructions when being executed by the processor further perform the following operations: for each generated multi-media audio and video file, before outputting the first encoded picture data conforming to the predetermined standard corresponding to the multi-media audio and video file, generate sequence parameter set network abstraction layer data and picture parameter set network abstraction layer data corresponding to the multi-media audio and video file respectively, and output the generated sequence parameter set network abstraction layer data and picture parameter set network abstraction layer data together with the first encoded picture data conforming to the second encoding mode.

10. The apparatus of claim 9, wherein the instructions when being executed by the processor further perform the following operations:

generating the sequence parameter set network abstraction layer data and picture parameter set network abstraction layer data corresponding to the multi-media audio and video file according to the network abstraction layer data structure defined in the second encoding mode.

11. The apparatus of claim 8, wherein the instructions when being executed by the processor further perform the following operations initiating N threads when the first frame of original picture data is obtained, where N is a positive integer which is larger than 1; determine whether there is a free thread each time the condition for generating a new multi-media audio and video file is met, and select a free thread to generate the multi-media audio and video file if there is, otherwise wait for a free thread to generate the multi-media audio and video file.

12. The apparatus of claim 8, wherein the instructions when being executed by the processor further perform the following operations initiating P threads when the first multi-media audio and video file is generated, where P is a positive integer which is larger than 1; determining whether there is a free thread each time a new multi-media audio and video file needs to be parsed and encapsulated, and selecting a free thread to parse and encapsulate the multi-media audio and video file if there is, otherwise wait for a free thread to parse and encapsulate the multi-media audio and video file.

13. The apparatus of claim 8, wherein the instructions when being executed by the processor further perform the following operations:

receiving respective encoded picture data conforming to the second encoding mode sent by another apparatus other than the video encoding apparatus in which the data receiving unit locates, and sending each encoded picture data conforming to the second encoding mode to the data decoding unit respectively;

each time one piece of encoded picture data conforming to the second encoding mode is received, decoding the one piece of encoded picture data;

displaying the decoded picture data according to the result of decoding.

* * * * *